(12) United States Patent
Chen et al.

(10) Patent No.: US 8,737,199 B2
(45) Date of Patent: May 27, 2014

(54) TECHNIQUES USING DIFFERENTIAL PRECODING FOR HIGHLY CORRELATED CHANNELS IN WIRELESS NETWORKS

(75) Inventors: Xiaogang Chen, Beijing (CN); Yuan Zhu, Beijing (CN); Qinghua Li, San Ramon, CA (US); Xintian E. Lin, Palo Alto, CA (US); Yang-Seok Choi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 602 days.

(21) Appl. No.: 12/757,109

(22) Filed: Apr. 9, 2010

(65) Prior Publication Data

US 2011/0249655 A1    Oct. 13, 2011

(51) Int. Cl.
*G01R 31/08*    (2006.01)

(52) U.S. Cl.
USPC .......................... 370/224; 370/332; 375/267

(58) Field of Classification Search
USPC ......... 370/332–338, 252, 310, 349–350, 342; 375/267, 308, 295
See application file for complete search history.

(56) References Cited

U.S. PATENT DOCUMENTS

| | | | |
|---|---|---|---|
| 7,839,945 B2* | 11/2010 | Khojastepour et al. | 375/267 |
| 8,149,791 B2* | 4/2012 | Li et al. | 370/334 |
| 2007/0160011 A1* | 7/2007 | Kim et al. | 370/332 |
| 2008/0232501 A1* | 9/2008 | Khojastepour et al. | 375/267 |
| 2008/0273624 A1 | 11/2008 | Kent et al. | |
| 2010/0054114 A1* | 3/2010 | Li et al. | 370/203 |
| 2011/0064156 A1* | 3/2011 | Kim et al. | 375/267 |
| 2013/0223495 A1 | 8/2013 | Chen et al. | |

FOREIGN PATENT DOCUMENTS

CN    101635612 A    1/2010
WO    2008/030035 A2    3/2008

OTHER PUBLICATIONS

Office Action Received for the Korean Patent Application No. 2011-0032926, mailed on Jul. 26, 2012, 3 pages of English Translation only.
Notice of Allowance received for Korean Patent Application 10-2011-0032926, mailed on Dec. 26, 2012, 3 pages of Office Action including 1 page of English translation.
Office Action received for Chinese Patent Application No. 201110093190.2, mailed on May 21, 2013, 21 pages of Office action including 11 pages of English translation.
Ding et al, "Research on Modulation Diversity of Bit-Interleaved Space-Time Coded Modulation" Wanfang Science Periodical Database, Issue 3, vol. 31, Mar. 2008.
Luo et al.,"Space-Time-Frequency Block Coding for OFDM Systems" ,Wanfang Science Periodical Database, Issue 3, vol. 27, 2005.
Office Action received for Chinese Patent Application No. 201110093190.2, mailed on Feb. 8, 2014, 12 pages of English Translation and 9 Pages of Office Action.
Office Action received for U.S. Appl. No. 13/591,613, mailed on Dec. 31, 2013, 23 Pages.

* cited by examiner

*Primary Examiner* — Ricky Ngo
*Assistant Examiner* — Iqbal Zaidi
(74) *Attorney, Agent, or Firm* — Thorpe North & Western, LLP

(57) ABSTRACT

An embodiment of the present invention provides a method of using differential precoding for highly correlated channels in a wireless network, comprising, using a differential codebook optimized for highly correlated antennas.

19 Claims, 4 Drawing Sheets

TECHNIQUES USING DIFFERENTIAL PRECODING FOR HIGHLY CORRELATED CHANNELS IN WIRELESS NETWORKS

BACKGROUND

In orthogonal frequency multiple access-multiple input multiple output (OFDMA-MIMO) based broadband radio systems such as, but not limited to, those that conform to the institute for electronic and electrical engineers (IEEE) 802.16m or LTE (Long Term Evolution—3GPP 4 G technology) systems, beamforming is an effective method to improve the receiving signal to noise ratio (SNR). When the base station's (BS's) transmit antennas are closely mounted, the antenna beam pattern usually has low spatial selectivity, and thus the principle Eigen mode dominates the capacity. In addition, the elements of the ideal precoding vectors are usually constant modulus for highly correlated antennas.

Thus, a strong need exists for techniques using differential precoding for highly correlated channels in wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
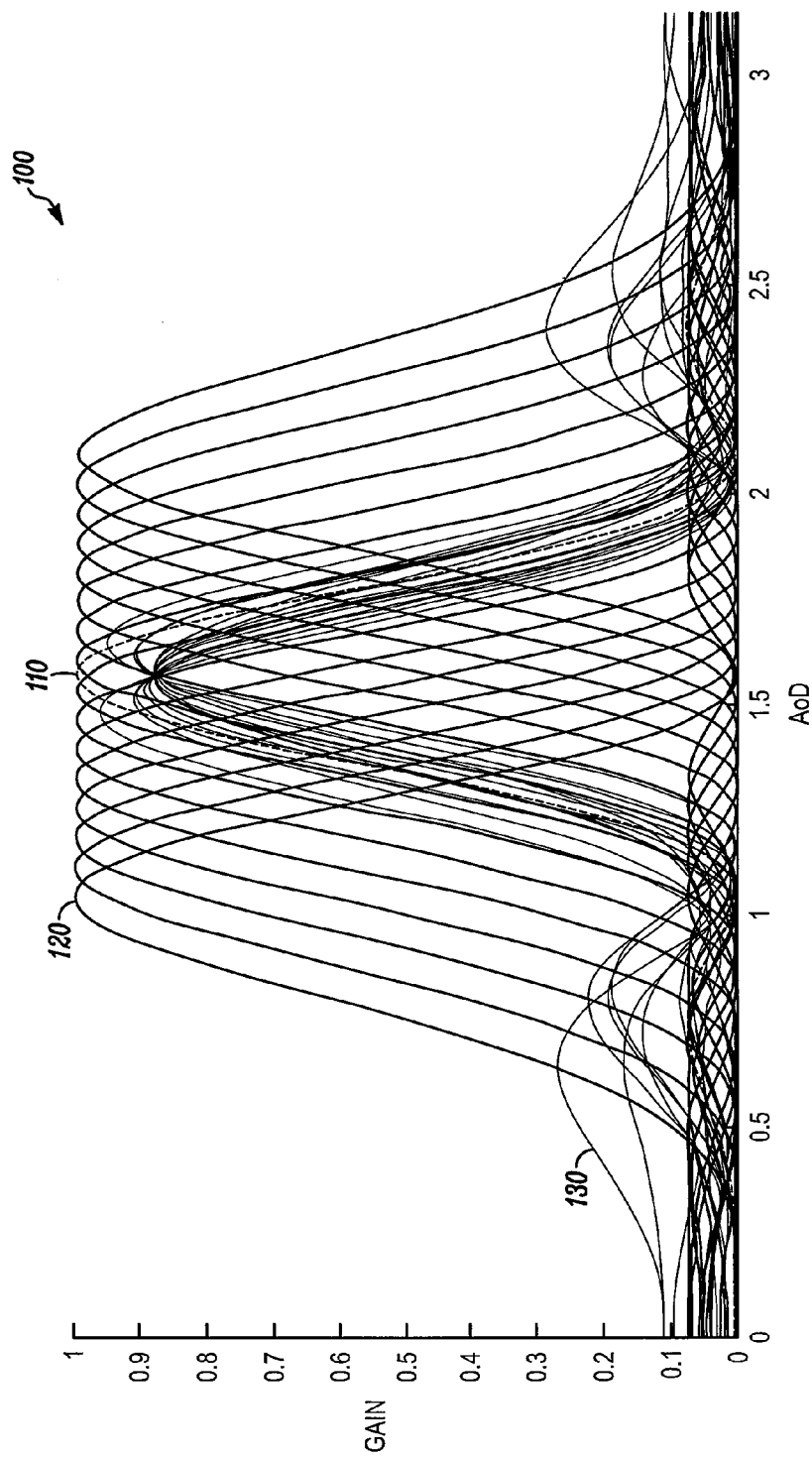
FIG. 1 provides an antenna array response of base codeword and the differential codewords according to embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention provide a differential codebook optimized for highly correlated antennas and may be adapted to the "downloadable" codebook in LTE. Compared with existing differential precoding schemes, the proposed codebook of the present invention has better performance, especially for a high speed environment and lower complexity at a mobile station (MS).

Assuming there are $N_t$ transmit antenna, $V(t-1)$ is the precoding vector used at the last frame and $V(0)$ is the base codeword selected at the first frame of a differential period (e.g. 4 frames). Firstly, an MS needs to measure the short term channel covariance matrix $$R = H^H H \tag{1}$$

Secondly, the MS needs to determine the feedback with the following criteria:

$$\hat{\theta} = \underset{\hat{\theta} \in \theta_s}{\mathrm{argmaxdet}}\left(I + \frac{\gamma}{N_s} Q(\hat{\theta})^H R Q(\hat{\theta})\right). \tag{2}$$

Where $$\theta_s \in \left[\theta_b - \alpha : \frac{2\alpha}{15} : \theta_b + \alpha\right] \tag{3}$$

$$Q(\hat{\theta}) = \begin{bmatrix} 1 \\ \exp(-j\pi\cos(\hat{\theta})) \\ \exp(-j2\pi\cos(\hat{\theta})) \\ \exp(-j3\pi\cos(\hat{\theta})) \end{bmatrix} \tag{4}$$

$$\theta_b = \underset{\theta \in [0,\pi)}{\mathrm{argmax}} |a(\theta)^H V(0)|^2, \tag{5}$$

$$a(\theta) = \left[\begin{array}{cccc} 1 & e^{-j2\pi\frac{d}{\lambda}\cos(\theta)} & e^{-j2\pi\frac{2d}{\lambda}\cos(\theta)} & \ldots & e^{-j2\pi\frac{(N_t-1)d}{\lambda}\cos(\theta)} \end{array}\right].$$

Which is the angle corresponding to the maximum of antenna array responds; $\theta_s$ is a set of predefined angles in a range of $[-a, a]$ degree ($a=15$ is recommended). Then the index of $\hat{\theta}$ is feedback to a base station (BS).

Based on the $\hat{\theta}$ that is feedback from the MS, the BS reconstruct precoding vector as following:

$$V(t) = Q(\hat{\theta}) \tag{6}$$

Table I below compares the performance of the existing differential precoding scheme and the differential precoding scheme according to embodiments of the present invention. The performance when only a base codebook is used is also listed for comparison. For a base codebook only scheme, 6 bits is fed back every frame by MS; for the two differential schemes, 4 bits is feedback from MS at the first frame in each reset period (4 frames) to select the 16 DFT codeword in base codebook, and 4 bits is feedback for differential codebook selection in the succeed frames. It can be seen that embodiments of the present invention outperforms a 16 m differential scheme except when the 5 degree 16 m differential codebook is used and MS speed is low. Moreover, the 20 degree 16 m differential codebook cannot track the changes of a channel when an MS moves with a high speed.

TABLE I

| | Performance comparisons of differential precoding schemes | | | | | | | | | | | |
|---|---|---|---|---|---|---|---|---|---|---|---|---|
| | 3 km/h 20 degree | | | | 30 km/h 20 degree | | | | 120 km/h 20 degree | | | |
| SNR(dB) | 0 | 4 | 8 | 12 | 0 | 4 | 8 | 12 | 0 | 4 | 8 | 12 |
| Base_only | 2.8553 | 4.0224 | 5.2765 | 6.5729 | 2.8099 | 3.971 | 5.2217 | 6.5165 | 2.807 | 3.9688 | 5.22 | 6.5151 |
| Diff_16m | 2.8556 | 4.0227 | 5.2768 | 6.5732 | 2.8042 | 3.9646 | 5.2149 | 6.5094 | 2.8003 | 3.9613 | 5.2121 | 6.507 |
| Diff_new | 2.8657 | 4.0341 | 5.2888 | 6.5855 | 2.8182 | 3.9803 | 5.2316 | 6.5265 | 2.8173 | 3.9802 | 5.232 | 6.5274 |
| | 3 km/h 5 degree | | | | 30 km/h 5 degree | | | | 120 km/h 5 degree | | | |
| SNR(dB) | 0 | 4 | 8 | 12 | 0 | 4 | 8 | 12 | 0 | 4 | 8 | 12 |
| Base_only | 2.8553 | 4.0224 | 5.2765 | 6.5729 | 2.8099 | 3.971 | 5.2217 | 6.5165 | 2.807 | 3.9688 | 5.22 | 6.5151 |
| Diff_16m | 2.8665 | 4.0349 | 5.2898 | 6.5865 | 2.8137 | 3.9753 | 5.2263 | 6.5211 | 2.8112 | 3.9734 | 5.2249 | 6.5201 |
| Diff_new | 2.8657 | 4.0341 | 5.2888 | 6.5855 | 2.8182 | 3.9803 | 5.2316 | 6.5265 | 2.8173 | 3.9802 | 5.232 | 6.5274 |

The principle of the present invention may be similar to the existing 802.16m precoding scheme. However, embodiments of the present invention provide a difference in equation (2) set forth above, where in the existing 16 m scheme $U=[V(t-1)V(t-1)^{-1}]^H$, and Q is the predefined differential codebook where the differential codeword around the center codeword with a fixed degree, e.g. 20 degree.

For highly correlated antennas, the elements of precoding codeword are constant modulus in most case. The proposed differential codebook realizes this property by rotating the elements of the DFT codeword in a base codebook with some corresponding angles. This will keep the constant modulus property of DFT codeword after differential operation. This is preferred for power amplifier at the radio chains.

With a properly designed differential codebook, the dominate beam of an antenna array response of differential codeword may shift within a predefined angle compared with the beam of the corresponding base codeword. This property will guarantee a maximum gain in the principle Eigen mode of the channel in the viewpoint of an antenna array response.

Looking now at FIG. 1, shown generally as 100, shows this property clearly as Gain vs. AoD. Line 110 shows the antenna array response of a base codeword and lines 120 are the antenna array response after the proposed differential scheme. Lines 130 are the antenna array response after the 16 m differential scheme.

In addition, the Q operation is only needed to be performed one time in a reset period at the MS instead of being calculated every frame if the shifting angle range is designed properly (for example, but not limited to [−20 20] degrees may be recommended). Thus the complexity is reduced at MS.

Figure 2:
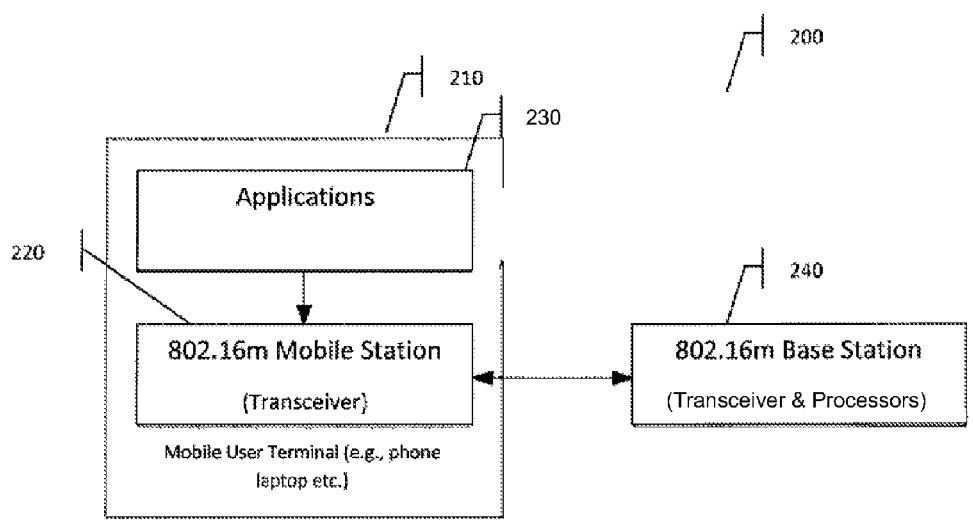
FIG. 2 illustrates a system according to embodiments of the present invention.

Turning to FIG. 2 at 200 provides a system diagram according to embodiments of the present invention, in which an 802.16 MS 220 and applications 230 are collocated in a mobile user terminal 210, such as, but not limited to mobile phone, laptop, PDA etc. MS and a base station (BS) 240 may communicate wirelessly. Both MS and BS may utilize transceivers that operate according to the embodiments set forth herein.

Figure 3:
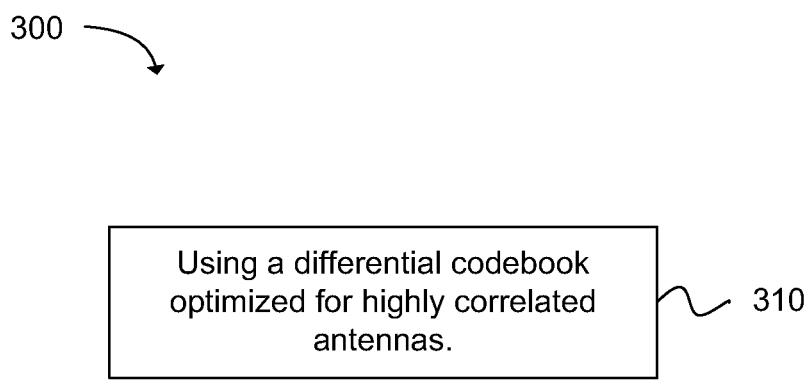
FIG. 3 illustrates a method of using differential precoding for highly correlated channels in a wireless network according to embodiments of the present invention.

Another example provides a method 300 of using differential precoding for highly correlated channels in a wireless network, as shown in the flow chart in FIG. 3. The method includes the operation of using a differential codebook optimized for highly correlated antennas, as in block 310.

Figure 4:
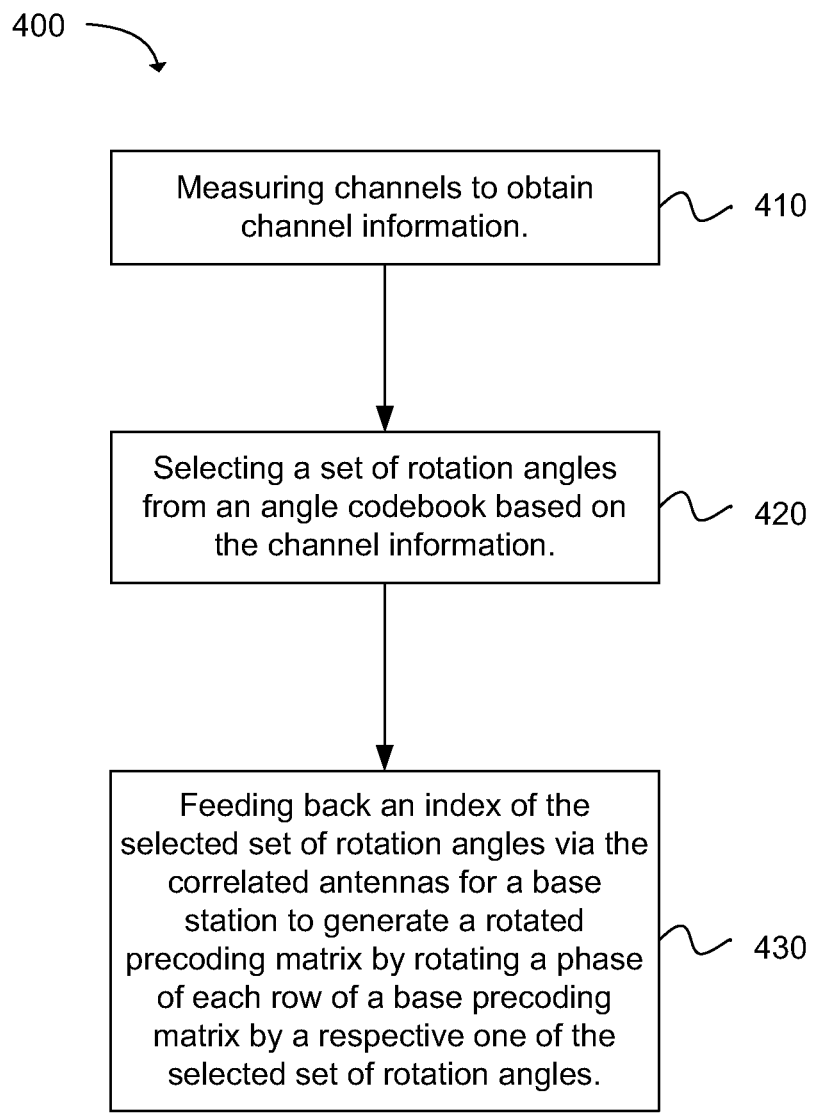
FIG. 4 illustrates a method for execution by one or more processors in a mobile station of using differential precoding for correlated antennas in a wireless network according to embodiments of the present invention.

Another example provides a method 400 for execution by one or more processors in a mobile station of using differential precoding for correlated antennas in a wireless network, as shown in the flow chart in FIG. 4. The method includes the operation of measuring channels to obtain channel information, as in block 410. The operation of selecting a set of rotation angles from an angle codebook based on the channel information follows, as in block 420. An additional operation is feeding back an index of the selected set of rotation angles via the correlated antennas for a base station to generate a rotated precoding matrix by rotating a phase of each row of a base precoding matrix by a respective one of the selected set of rotation angles, as in block 430.

A further embodiment of the present invention may provide a computer readable medium encoded with computer executable instructions, which when accessed, cause a machine to perform operations comprising using differential precoding for highly correlated channels in a wireless network, comprising by using a differential codebook optimized for highly correlated antennas.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method of using differential precoding for highly correlated channels in a wireless network, comprising:
   using a differential codebook optimized for highly correlated antennas that comprises:
      measuring the short term channel covariance matrix by a mobile station (MS) operable in said wireless network and determining feedback based on the following criteria:
      measuring by said MS a short term channel covariance matrix $R=H^H H$ (1);
      determining by said MS the feedback with the following criteria:

$$\hat{\theta} = \underset{\hat{\theta} \in \theta_s}{\operatorname{argmax\,det}}\left(I + \frac{\gamma}{N_s}Q(\hat{\theta})^H RQ(\hat{\theta})\right),$$

where $\theta_s \in \left[\theta_b - \alpha : \frac{2\alpha}{15} : \theta_b + \alpha\right]$, $$Q(\hat{\theta}) = \begin{bmatrix} 1 \\ \exp(-j\pi\cos(\hat{\theta})) \\ \exp(-j2\pi\cos(\hat{\theta})) \\ \exp(-j3\pi\cos(\hat{\theta})) \end{bmatrix},$$

-continued $$\theta_b = \underset{\theta \in [0,\pi)}{\mathrm{argmax}} |a(\theta)^H V(0)|^2,$$

$$a(\theta) = \begin{bmatrix} 1 & e^{-j2\pi\frac{d}{\lambda}\cos(\theta)} & e^{-j2\pi\frac{2d}{\lambda}\cos(\theta)} & \ldots & e^{-j2\pi\frac{(N_t-1)d}{\lambda}\cos(\theta)} \end{bmatrix},$$

and $\theta_s$ is a set of predefined angles in a range of $[-\alpha, \alpha]$ degrees; and wherein the index of $\hat{\theta}$ is then fed back to a base station (BS) and based on said $\hat{\theta}$ that is fed back from said MS, said BS reconstruct a precoding vector $V(t)=Q(\hat{\theta})$.

2. The method of claim 1, wherein said differential codebook optimized for highly correlated antennas is adaptable to a downloadable codebook used in a wireless network that conforms to an Institute for Electronic and Electrical Engineering (IEEE) 802.16m or LTE standard.

3. The method of claim 1, wherein $U=[V(t-1)V(t-1)^\perp]^H$ and Q is a predefined differential codebook where the differential is a codeword around a center codeword with a fixed degree.

4. The method of claim 3, wherein said fixed degree is 20 degrees.

5. The MS of claim 4, wherein said differential codebook rotates elements of a DFT codeword in a base codebook with some corresponding angles to keep a constant modulus property of said DFT codeword after differential operation.

6. The method of claim 1, wherein said differential codebook rotates elements of a DFT codeword in a base codebook with some corresponding angles to keep a constant modulus property of said DFT codeword after differential operation.

7. A mobile station (MS), comprising:
a transceiver adapted for communication with a base station (BS) in a wireless network, said transceiver further adapted to use differential precoding for highly correlated channels in a wireless network that uses a differential codebook optimized for highly correlated antennas that comprises:
measuring the short term channel covariance matrix by a mobile station (MS) operable in said wireless network and determining feedback based on the following criteria:
measuring by said MS a short term channel covariance matrix $R=H^H H$;
determining by said MS the feedback with the following criteria:

$$\hat{\theta} = \underset{\hat{\theta} \in \theta_s}{\mathrm{argmaxdet}}\left(I + \frac{\gamma}{N_s}Q(\hat{\theta})^H R Q(\hat{\theta})\right),$$

Where $\theta_s \in \left[\theta_b - \alpha : \frac{2\alpha}{15} : \theta_b + \alpha\right]$, $$Q(\hat{\theta}) = \begin{bmatrix} 1 \\ \exp(-j\pi\cos(\hat{\theta})) \\ \exp(-j2\pi\cos(\hat{\theta})) \\ \exp(-j3\pi\cos(\hat{\theta})) \end{bmatrix},$$

$$\theta_b = \underset{\theta \in [0,\pi)}{\mathrm{argmax}}|a(\theta)^H V(0)|^2,$$

$$a(\theta) = \begin{bmatrix} 1 & e^{-j2\pi\frac{d}{\lambda}\cos(\theta)} & e^{-j2\pi\frac{2d}{\lambda}\cos(\theta)} & \ldots & e^{-j2\pi\frac{(N_t-1)d}{\lambda}\cos(\theta)} \end{bmatrix},$$

and $\theta_s$ is a set of predefined angles in a range of $[-\alpha, \alpha]$ degrees; and wherein the index of $\hat{\theta}$ is then fed back to a base station (BS) and based on said $\hat{\theta}$ that is fed back from said MS, said BS reconstruct a precoding vector $V(t)=Q(\hat{\theta})$.

8. The MS of claim 7, wherein said differential codebook optimized for highly correlated antennas is adaptable to a downloadable codebook used in a wireless network that conforms to an Institute for Electronic and Electrical Engineering (IEEE) 802.16m or LTE standard.

9. The MS of claim 7, wherein $U=[V(t-1)V(t-1)^\perp]^H$ and Q is a predefined differential codebook where the differential is a codeword around a center codeword with a fixed degree.

10. The MS of claim 9, wherein said fixed degree is 20 degrees.

11. A method for execution by one or more processors in a mobile station (MS) of using differential precoding for correlated antennas in a wireless network, comprising:
measuring the short term channel covariance matrix $R=H^H H$ of channels to obtain channel information;
determining channel information with the following criteria:

$$\hat{\theta} = \underset{\hat{\theta} \in \theta_s}{\mathrm{argmaxdet}}\left(I + \frac{\gamma}{N_s}Q(\hat{\theta})^H R Q(\hat{\theta})\right),$$

where $\theta_s \in \left[\theta_b - \alpha : \frac{2\alpha}{15} : \theta_b + \alpha\right]$, $$Q(\hat{\theta}) = \begin{bmatrix} 1 \\ \exp(-j\pi\cos(\hat{\theta})) \\ \exp(-j2\pi\cos(\hat{\theta})) \\ \exp(-j3\pi\cos(\hat{\theta})) \end{bmatrix},$$

$$\theta_b = \underset{\theta \in [0,\pi)}{\mathrm{argmax}}|a(\theta)^H V(0)|^2,$$

$$a(\theta) = \begin{bmatrix} 1 & e^{-j2\pi\frac{d}{\lambda}\cos(\theta)} & e^{-j2\pi\frac{2d}{\lambda}\cos(\theta)} & \ldots & e^{-j2\pi\frac{(N_t-1)d}{\lambda}\cos(\theta)} \end{bmatrix},$$

and $\theta_s$ is a set of predefined angles in a range of $[-\alpha, \alpha]$ degrees; and wherein the index of $\hat{\theta}$ is then fed back to a base station (BS) and based on said $\hat{\theta}$ that is fed back from said MS, said BS reconstruct a precoding vector $V(t)=Q(\hat{\theta})$;

selecting a set of rotation angles from an angle codebook based on the channel information; and feeding back an index of the selected set of rotation angles via the correlated antennas for a base station to generate a rotated precoding matrix by rotating a phase of each row of a base precoding matrix by a respective one of the selected set of rotation angles.

12. The method of claim 11, wherein said angle codebook has a range of about 20 degrees.

13. The method of claim 11, wherein said channel information is a covariance matrix.

14. The method of claim 11, wherein said rotated precoding matrix generated by the base station has a constant modulus.

15. The method of claim 11, wherein said set of rotation angles is selected to maximize gain in a principal Eigen mode of the channels.

16. A base station to use differential precoding for correlated antennas in a wireless network, the base station (BS) comprising:

one or more processors and a transceiver to:

receive an index to a set of rotation angles from a mobile station with the following criteria:

$$\hat{\theta} = \underset{\hat{\theta} \in \theta_s}{\operatorname{argmaxdet}}\left(I + \frac{\gamma}{N_s}Q(\hat{\theta})^H R Q(\hat{\theta})\right)$$

Where $\theta_s \in \left[\theta_b - \alpha : \frac{2\alpha}{15} : \theta_b + \alpha\right]$, $$Q(\hat{\theta}) = \begin{bmatrix} 1 \\ \exp(-j\pi\cos(\hat{\theta})) \\ \exp(-j2\pi\cos(\hat{\theta})) \\ \exp(-j3\pi\cos(\hat{\theta})) \end{bmatrix},$$

$\theta_b = \underset{\theta \in [0,\pi)}{\operatorname{argmax}} |a(\theta)^H V(0)|^2$, $a(\theta) = \begin{bmatrix} 1 & e^{-j2\pi\frac{d}{\lambda}\cos(\theta)} & e^{-j2\pi\frac{2d}{\lambda}\cos(\theta)} & \ldots & e^{-j2\pi\frac{(N_t-1)d}{\lambda}\cos(\theta)} \end{bmatrix}$, and $\theta_s$ Bs is a set of predefined angles in a range of $[-\alpha,\alpha]$ degrees; and wherein the index of $\hat{\theta}$ is then fed back to the BS and based on said $\hat{\theta}$ that is fed back from said mobile station (MS);

reconstructing a precoding vector $V(t)=Q(\hat{\theta})$ retrieve the set of rotation angles based on the received index;

generate a rotated precoding matrix by rotating a phase of each row of a base precoding matrix by a respective one of the set of rotation angles; and transmit data to the mobile station using the rotated precoding matrix.

17. The base station of claim 16, wherein said set of rotation angles spans a range of about 20 degrees.

18. The base station of claim 16, wherein said rotated precoding matrix has a constant modulus.

19. The base station of claim 16, wherein said set of rotation angles maximizes gain in a principal Eigen mode in the data transmitted using the rotated precoding matrix.

* * * * *

UNITED STATES PATENT AND TRADEMARK OFFICE
CERTIFICATE OF CORRECTION

PATENT NO. : 8,737,199 B2  
APPLICATION NO. : 12/757109  
DATED : May 27, 2014  
INVENTOR(S) : Chen et al.

Page 1 of 1

It is certified that error appears in the above-identified patent and that said Letters Patent is hereby corrected as shown below:

In the Claims

Column 4, line 51, Claim 1, delete " $R = H^H H$ (1);" and insert -- $R = H^H H$; --, therefor.

Column 5, line 25, Claim 5, delete "MS" and insert -- method --, therefor.

Column 5, line 52, Claim 7, after " $\left(I + \frac{\gamma}{N_s} Q(\hat{\theta})^H R Q(\hat{\theta})\right)$ " insert -- , --.

Column 5, line 55, Claim 7, delete "Where" and insert -- where --, therefor.

Column 7, line 7, Claim 16, after " $\left(I + \frac{\gamma}{N_s} Q(\hat{\theta})^H R Q(\hat{\theta})\right)$ " insert -- , --.

Column 7, line 10, Claim 16, delete "Where" and insert -- where --, therefor.

Column 8, line 2, Claim 16, delete "$\theta_s$ Bs" and insert -- $\theta_s$ --, therefor.

Column 8, line 7, Claim 16, after " $V(t) = Q(\hat{\theta})$ " insert -- ; --.

Signed and Sealed this  
Sixteenth Day of December, 2014

Michelle K. Lee  
*Deputy Director of the United States Patent and Trademark Office*